United States Patent [19]

Rabatin

[11] 4,116,865

[45] Sep. 26, 1978

[54] METHOD FOR PREPARING THERMOLUMINESCENT MATERIALS UTILIZING RARE EARTH OXYHALIDES ACTIVATED WITH TERBIUM

[75] Inventor: Jacob G. Rabatin, Chardon, Ohio

[73] Assignee: General Electric Company, Schenectady, N.Y.

[21] Appl. No.: 765,511

[22] Filed: Feb. 4, 1977

Related U.S. Application Data

[60] Continuation-in-part of Ser. No. 625,788, Oct. 24, 1975, abandoned, which is a division of Ser. No. 565,642, Apr. 7, 1975, Pat. No. 3,996,472.

[51] Int. Cl.$^2$ ............................................ C09K 11/46
[52] U.S. Cl. ............................................ 252/301.4 H
[58] Field of Search ................ 252/301.4 H; 250/483, 250/484

[56] References Cited

U.S. PATENT DOCUMENTS

| | | | |
|---|---|---|---|
| 3,591,516 | 7/1971 | Rabatin | 252/301.4 H |
| 3,617,743 | 11/1971 | Rabatin et al. | 250/483 X |
| 3,666,676 | 5/1972 | Rabatin et al. | 252/301.4 H |

*Primary Examiner*—Jack Cooper
*Attorney, Agent, or Firm*—John F. McDevitt; Lawrence R. Kempton; Frank L. Neuhauser

[57] ABSTRACT

Thermoluminescent materials have been found suitable for measuring long term exposures to low level ionizing radiation. Oxyhalides of lanthanum, gadolinium and yttrium, including the oxychlorides and oxybromides are activated with terbium and have been found to be most efficient oxygen dominated phosphors having thermoradiant efficiencies with excitation by low level ionizing radiation. Thermoluminescence response increases when the previous materials have elemental hafnium and zirconium additives. The thermoluminescent oxyhalide of the invention is prepared by forming mixed oxalates of the metal constituents, firing the mixed oxalates in air to form an oxide mixture, blending the oxide mixture with an ammonium halide and firing the resultant mixture to form the oxyhalide.

11 Claims, 2 Drawing Figures

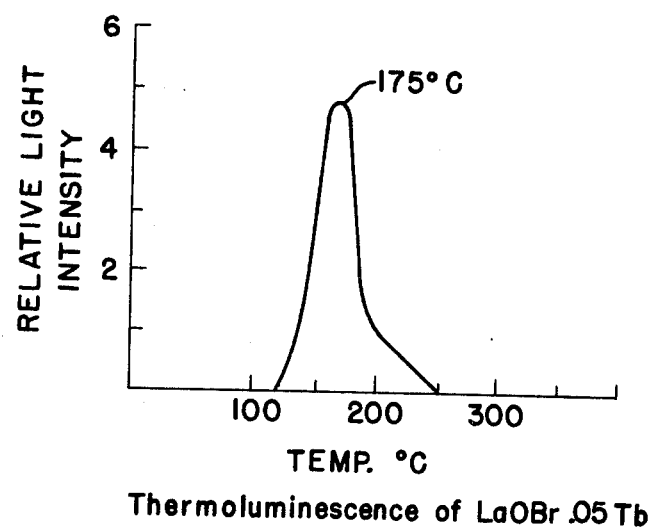
Fig. 1 Thermoluminescence of LaOBr:.05Tb
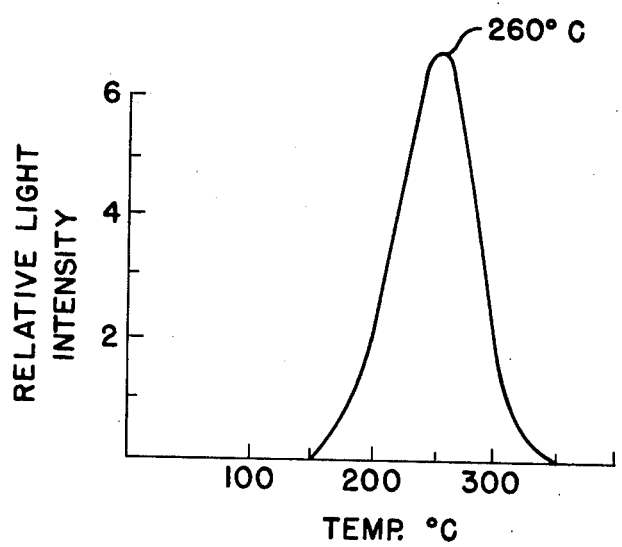
Fig. 2 Thermoluminescence of LaOBr:.05Tb.0005Zr

METHOD FOR PREPARING THERMOLUMINESCENT MATERIALS UTILIZING RARE EARTH OXYHALIDES ACTIVATED WITH TERBIUM

CROSS-REFERENCE TO RELATED APPLICATIONS

This application is a continuation in part of my prior application Ser. No. 625,788, filed Oct. 24, 1975, and now abandoned, which is a division of my earlier application Ser. No. 565,642, filed Apr. 7, 1975, and now issued U.S. Pat. No. 3,996,472. Both earlier filed applications are assigned to the assignee of the present application.

BACKGROUND OF THE INVENTION

Field of the Invention

The present invention relates to thermoluminescent materials, and more particularly to such materials characterized as rare earth oxyhalides, activated with terbium. The invention also relates to a thermoluminescent dosimeter which utilizes the proportional relationship between the relative intensity of the emitted light and the dose of ionizing radiation.

BRIEF DESCRIPTION OF THE PRIOR ART

U.S. Pat. No. 3,617,743, issued to the present inventor, relates to luminescent materials categorized as rare earth oxyhalides activated with terbium utilized in an X-ray image converter. The materials disclosed in this patent were found to produce phosphors that are highly efficient light producers under cathode ray, ultraviolet and X-ray excitation. By luminescence, it is meant that light is emitted in response to any of these excitations. Subsequent to the development of the materials disclosed in the mentioned patent, it has been discovered that rare earth oxyhalides activated with terbium also have the capability of acting as thermoluminescent materials. By this, it is meant that luminescence takes place upon heating of the materials, after such materials have been exposed to ionizing radiation. As such, the presently disclosed materials serve as excellent radiation dosimeters.

In the past, radiation dosimeters have included X-ray film which became exposed when subjected to ionizing radiation. In order to determine the extent of radiation, the X-ray film had to be developed. Obviously, the requirement of development creates inconvenient and inefficient dosimetry.

BRIEF DESCRIPTION OF THE PRESENT INVENTION

The present invention relates to novel thermoluminescent (TL) materials, especially suitable for use in measuring long term exposures to low level ionizing radiation such as that found in medical radiography and nuclear power plant operations. Because of the hazards for persons exposed to ionizing radiation and because of rigid safety standards, it is necessary to measure exposure dosages accurately. The method of TL dosimetry (TLD) is being increasingly used for these purposes. The method is based on the fact that a thermoluminescent material contains defects or impurity atoms which can trap electrons or positive holes at metastable energy levels when the material is subjected to ionizing radiation. On heating the material, the trapped metastable entities return to the normal ground state thereby emitting visible radiation called thermoluminescence. TLD utilizes the proportional relationship between the relative intensity of the emitted light and the dose of ionizing radiation. Suitable readout devices have been constructed which can measure the amount of emitted light and relate this to roentgens of radiation exposure. The relationship between the light emitted by a thermoluminescent material and the temperature of the material as the material is heated at a constant rate is represented by the so-called glow curves, to be discussed hereinafter. The advantages mentioned above are some of the reasons why thermoluminescence is rapidly becoming one of the more common methods to measure ionizing radiation for such applications as clinical measurements of dosages in radiotherapy and monitoring of personnel at various medical, industrial and government installations dealing with sources of ionizing radiation. TLD capable of measuring low levels of exposure below 1 mR are important in some health physics applications. The need for low level environmental monitoring around nuclear installations is increasing as more and more nuclear power generators are installed.

BRIEF DESCRIPTION OF THE FIGURES

FIG. 1 is a glow curve illustrating thermoluminescence of LaOBr.05 Tb.

FIG. 2 is a glow curve illustrating thermoluminescence of LaOBr:.05 Tb .0005 Zr.

DETAILED DESCRIPTION OF THE INVENTION

The thermoluminescent materials of the present invention are expressed by the following general formula:

$$M_{1-w-y}OX:Tb_wA_y$$

wherein M is an element selected from the group consisting of La, Gd and Y. X is an element selected from the group consisting of Cl and Br. A is an elemental additive selected from a group consisting of Zr and Hf. $w$ is from 0.005 to 0.30 mole per mole of the selected oxyhalide. $y$ is from zero to 0.01 mole per mole of the selected oxyhalide.

The general method for preparation of the above defined thermoluminescent material is described in previously issued U.S. Pat. No. 3,591,516 to the present inventor. In accordance with said general method, a mixture of the rare earth oxide selected from the group of lanthanum oxide, gadolinium oxide, and yttrium oxide with terbium oxide is prepared which further contains an elemental additive selected from the group of zirconium and hafnium. Said oxide mixture of the selected rare earth and selected elemental additive is prepared by dissolving the starting materials in nitric acid and thereafter precipitating said oxides as mixed oxalates by adding oxalic acid to the dissolved mixture. The starting material for the elemental additive can be a soluble inorganic salt of the corresponding element. The oxalate mixture is then separated and fired in air to an elevated temperature of at least about 1,000° C to form a mixture of the selected rare earth oxide containing both the terbium activator and additive oxide in a suitable form to prepare the desired thermoluminescent material. This mixture is blended with ammonium chloride or ammonium bromide and fired at an elevated temperature of at least about 400° C to form the corresponding terbium activated oxyhalide thermoluminescent material having the selected hafnium or zirconium element incorporated in the host structure. Said thermoluminescent material is then blended with an alkali metal halide having the same halide ion as the selected oxyhalide and recrystallized by refiring the mixture at an elevated temperature in the range 800°–1,200° C. The final product is prepared by customary removal of flux residue.

Typical glow curves for LaOBr.05 Tb and LaOBr.05 Tb 0.0005 Zr are shown in FIGS. 1 and 2, respectively. The integrated light intensities for the curves are proportional to the dose of ionizing radiation. The peak outputs are shown for the heating rates of about 10° C per second. Note that with the addition of zirconium (FIG. 2) the glow curve peak has shifted to about 260° C indicating deeper, more stable traps. The TL sensitivity has also increased by about 200%. Both features are desirable for TLD measurements of low intensity, long term radiation exposures. Typically, data for the glow curves may be derived by utilizing 35 mg samples of the thermoluminescent materials which are first irradiated on a 5 mil stainless steel strip heater with X-ray exposure for ten seconds at 1.0 ma and 90 $KV_p$. The heating rate may be approximately 10° C per second. The glow curves may be recorded by a stored image oscilloscope utilizing a photomultiplier set at 1,400 V. The areas under each glow curve is measured and is expressed as mv-sec. In the plots of FIG. 1 and FIG. 2, no corrections were made for differences in X-ray absorption between the materials.

The present invention provides a material for thermoluminescent dosimetry which has a very high sensitivity to ionizing radiations and a very stable retention of absorbed radiation for long term applications. Table I compares the relative TLD response of several materials when irradiated with 90 $KV_p$ X-rays. Also are included the principal TL glow peak temperatures and storage losses after irradiation. The first five samples are commercial TL materials obtained from the Harshaw Chemical Company. In accordance with the previously mentioned data gathering procedure, 35 mg size samples were irradiated for 10 seconds at 90 $KV_p$ and at 1.0 ma. The readouts were at 10° C per second heating rates. The glow curves were recorded by a stored image oscilloscope. The integrated areas under the curves are reported in Table I as millivolt-seconds. The glow curve peak temperatures were determined from calibration curves of TL materials whose glow peak temperatures are known.

TABLE I
Relative TLD Response of Several Materials under 90 $KV_p$ X-radiation

| Composition | Main TL Peak | Relative Sensitivity mv-sec | Storage Loss |
|---|---|---|---|
| LiF | 190° C | 1.0 | 5%/3 mo. |
| CaSO$_4$:Mn | 110 | 360 | 7%/hr. |
| CaSO$_4$:Dy | 230 | 140 | stable |
| CaF$_2$:Mn | 260 | 16 | stable |
| CaF$_2$:Dy | 180 | 80 | stable |
| LaOBr.02 Tb | 180 | 630 | 5%/mo. |
| LaOBr.05 Tb.0005 Zr | 260 | 1800 | stable |
| LaOBr .05 Tb.001 Hf | 260 | 3000 | stable |
| LaOBr .05 Tb | 180 | 750 | — |
| GdOBr.05 Tb .001 Zr | 275 | 330 | stable |

The data in Table I clearly establishes the superior nature of rare earth oxyhalides as TLD materials when terbium and zirconium and, or hafnium are present in the host structure. Compared to LiF, the most commonly used TLD material, the increased sensitivities are as much as 3,000 times greater. Compared to CaSO$_4$:Mn the most sensitive commercial material, the materials of the present invention are up to 8 times more sensitive and very importantly are much more stable. CaSO$_4$:Mn can be used only in applications where readouts are done within a few hours after irradiation.

The thermoluminescent materials of the present invention are expressed by the following formula:

$$M_{1-w-y}OX:Tb_wA_y$$

wherein M is an element selected from the group consisting of La, Gd and Y. X is an element selected from the group consisting of Cl and Br. A is an element selected from a group consisting of Zr and Hf. w is from 0.005 to 0.30 mole per mole of the selected oxyhalide. y is from zero to 0.01 mole per mole of the selected oxyhalide. These materials can be suitably prepared by a method previously described in U.S. Pat. No. 3,591,516.

An example of the preparation of the thermoluminescent materials is described below for the formulation:

$$La_{0.9495}OBr:Tb_{0.05}Zr_{0.0005}$$

and 136 gm Tb$_4$O$_7$, 1.54 gm Zr(NO$_3$)$_4$ 0.5 H$_2$O and 2330 gms La$_2$O$_3$ are dissolved in 3.05 liters of concentrated HNO$_3$. After dilution to 18.3 liters, there are added 50 liters of 10% oxalic acid to precipitate the mixed oxalates. After filtration and washing, the oxalate cake is fired for 2 hours at 1,000° C to reform the oxides. 2230 gms of the oxides are blended with 1,440 gms of NH$_4$Br and fired for 2 hours at 400° C in a covered silica container. This fired material is then blended with 531 gms of KBr and refired for 2½ hours at 1,000° C. The recrystallized oxyhalide powder is washed free of KBr, dried and pulverized for final use. The thermoluminescent material thus prepared shows very strong thermoluminescence with a glow peak at 260° C as is shown in FIG. 2 when irradiated with 90$KV_p$ X-radiation. The intensity of thermoluminescence has a nearly linear relationship for exposures between about $10^{-4}$R to $10^3$R. The thermoluminescent material according to the present invention can be used as a thermoluminescent dosimeter to detect and measure exposure dosages of X-rays, gamma rays, ultraviolet radiation, electron beams and for the gadolinium oxyhalides, also neutron beams.

Although the above example of preparation is limited to the rare earth La, the halogen Br, and the additive Zr, analogous processes are used to prepare the oxychloride or lanthanum as well as the oxyhalides of gadolinium and yttrium with appropriate terbium activation, with suitable adjustments for atomic weight. Similarly, the preparation of the thermoluminescent materials can be adjusted for the additive hafnium.

The effect of terbium concentration on the TL response of LaOBr:Tb.0005Zr is shown in Table II. The TL response increases nearly linearly as the terbium concentration is increased. The maximum response occurs at about a composition of LaOBr.15 Tb. Thereafter the response begins to slowly decrease as the phosphor efficiency decreases.

TABLE II
Effect of Tb Concentration on TL Response of LaOBr:Tb.0005 Zr

| Moles Tb | Temp. ° C of Main Glow Peak | TL Response mv-sec |
|---|---|---|
| .005 | 260° C | 400 |
| .05 | 260 | 1200 |

TABLE II-continued

Effect of Tb Concentration on TL Response of LaOBr:Tb.0005 Zr

| Moles Tb | Temp. °C of Main Glow Peak | TL Response mv-sec |
|---|---|---|
| .10 | 260 | 2000 |
| .15 | 260 | 3200 |

The main glow peak temperature is essentially unaffected by terbium concentration.

The effect of zirconium concentration on the TL response of LaOBr.05 Tb:Zr is shown in Table III. The principal effect is to increase the main glow peak from about 180° C to about 260° C. The TL response also increases. At higher zirconium concentrations, above about 0.002 moles Zr per mole of oxyhalide, the TL response begins to decrease in intensity.

TABLE III

Effect of Zr Concentration on Glow Peak and TL Response of LaOBr.05 Tb:Zr

| Mole Zr | Main TL Peak Temp. °C | TL Response mv-sec |
|---|---|---|
| none | 180° C | 600 |
| .0005 Zr | 260 | 1200 |
| .005 Zr | 260 | 800 |

The relative TL response of several commercial TL materials and LaOBr.02 Tb are shown in Table IV for exposures to about 5R of 0.66 MeV gamma radiation from a $Cs^{137}$ source. The relative absorption coefficients for this energy are not greatly different for various elements and thus the relative efficiencies of various TL materials are directly comparable. LaOBr.02 Tb is at least 34 times more responsive to these gamma rays than is LiF.

TABLE IV

Relative TL Responses of Various Materials under 5 R Exposure of 0.66 MeV Gamma Radiation from $Cs^{137}$

| TLD Material Composition | Relative Response mv-sec |
|---|---|
| LiF | 1.0 |
| $CaF_2$:Dy | 16.0 |
| $CaSO_4$:Dy | 10.0 |
| $CaF_2$:Mn | 4.0 |
| LaOBr.02 Tb | 34.0 |

TLD is also important in detecting thermal neutrons. To date, mostly $Li^6F$ has been used. One requirement for thermal neutron dosimetry is that the materials have a high cross section capture sigma for neutrons. In this respect $Li^6$ has a sigma of about 945 barns as compared to natural Gd which has a sigma of about 46,000 barns. Considering that, in general, the TL efficiencies of materials for any radiation are, in part, related to the amount of radiation absorbed and are related also to the relative TL efficiencies for other radiation, the relative TL efficiencies for thermal neutrons can be roughly extrapolated from relative TL efficiencies under X-ray or gamma excitation and from neutron capture data.

A comparison of estimated TLD responses of various materials under thermal neutron irradiation is tabulated in Table V, which follows.

TABLE V

| Composition | Rel. Sen. $C_s^{137}$ ex. | Calc. Rel. Sen. Thermal Neutron |
|---|---|---|
| $Li^6F$ | 1.0 | 1.0 |
| GdOBr.005Tb | 5 | 250 |
| $GdBO_3$.02 Dy | 2 | 100 |

An additional advantage for the use of GdOBr:Tb over $Li^6F$ is that the GdOBr:Tb has a relatively low sensitivity for X or gamma rays. Since neutrons are almost always associated with Gamma radiation, the use of LaOBr:Tb to detect gamma rays together with GdOBr:Tb can be made to give higher discrimination between the types of radiation as compared to $Li^7F$ and $Li^6F$ which are currently used. Also no isotope separations are needed for Gd as compared to $Li^6$. Also because of the very high cross section for thermal neutrons, it may be possible to detect fast neutrons by incorporation of a moderator.

From Table II it is apparent that the terbium concentration does not appear to be critical. Apparently, the energy trapping sites are associated with the host crystal and not with the activator. The function of Tb is to serve as a mode of luminescence once the sites are thermally emptied. Several impurities in PPM amounts are harmful to TL response either (1) by introducing shallow traps; these include Ti, Nd, Th, Pr, Sm, Ca, or (2) by reducing TL response; these include U, Yb, Eu, Dy. As indicated in Table I, the utilization of zirconium and hafnium increases the trap depths from about 180° C to 250°–270° C range. This increased TL stability is highly desirable in certain applications where low level ionizing radiation exposures are monitored for many months as in the cases for nuclear power plants.

It should be understood that the invention is not limited to the exact details of construction shown and described herein for obvious modifications will occur to persons skilled in the art.

What I claim as new and desire to secure by Letters Patent of the United States is:

1. A method for preparing a rare earth oxyhalide thermoluminescent material essentially expressed by the formula:

$$M_{1-w-y}OX:Tb_wA_y$$

wherein M is an element selected from the group consisting of La, Gd and Y;

X is an element selected from the group consisting of Cl and Br;

A is an elemental additive selected from the group consisting of Zr and Hf;

w is from 0.005 to 0.30 mole per mole of the oxyhalide; and y is from a small but effective amount to improve the thermoluminescence up to 0.01 mole per mole of the selected oxyhalide, said method comprising the steps of:

(a) dissolving terbium oxide, an oxide of a rare earth selected from the group consisting of La, Gd, and Y and an inorganic salt of the elemental additive in nitric acid to form a dissolved mixture, (b) adding sufficient oxalic acid to precipitate mixed oxalates of terbium, the selected rare earth and the elemental additive, (c) firing the mixed oxalates at an elevated temperature of at least about 1,000° C in air to form the corresponding oxide mixture, (d) blending the oxide mixture of step (c) with an ammonium halide selected from ammonium chloride and ammonium bromide, (e) firing the blend of step (d) at an elevated temperature of about 400° C to form the corresponding oxyhalide thermoluminescent material, (f) blending the thermoluminescent material with an alkali metal halide having the same halide ion as the oxyhalide, and (g) recrystallizing the blended material of step (f) by refiring in the temperature range 800°–1200° C.

2. The method of claim 1 wherein the rare earth oxide is lanthanum oxide.

3. The method of claim 2 wherein the oxyhalide is oxybromide.

4. The method of claim 3 wherein the elemental additive is zirconium.

5. The method of claim 3 wherein the elemental additive is hafnium.

6. The method of claim 1 wherein the rare earth oxide is gadolinium oxide.

7. The method of claim 1 wherein the rare earth oxide is yttrium oxide.

8. The method of claim 1 wherein the elemental additive is zirconium.

9. The method of claim 1 wherein the elemental additive is hafnium.

10. The method of claim 1 wherein the oxyhalide is oxychloride.

11. The method of claim 1 wherein the oxyhalide is oxybromide.